United States Patent
Belkhale et al.

(10) Patent No.: US 6,401,231 B1
(45) Date of Patent: Jun. 4, 2002

(54) METHOD AND APPARATUS FOR PERFORMING BOTH NEGATIVE AND POSITIVE SLACK TIME BUDGETING AND FOR DETERMINING A DEFINITE REQUIRED CONSTRAINT DURING INTEGRATED CIRCUIT DESIGN

(75) Inventors: Krishna Belkhale, Campbell; Johnson Chan Limqueco, Sunnyvale, both of CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 08/845,785

(22) Filed: Apr. 25, 1997

(51) Int. Cl.⁷ .............................................. G06F 17/50
(52) U.S. Cl. ............................................... 716/6; 716/4
(58) Field of Search ................................ 364/488, 489, 364/490, 491; 395/500, 500.07, 500.4, 500.11; 716/6, 4, 10, 18

(56) References Cited

U.S. PATENT DOCUMENTS

| | | | | |
|---|---|---|---|---|
| 5,521,837 A | * | 5/1996 | Frankle et al. | 364/491 |
| 5,648,913 A | * | 7/1997 | Bennett et al. | 364/491 |
| 5,659,484 A | * | 8/1997 | Bennett et al. | 364/491 |
| 5,764,525 A | * | 6/1998 | Mahmood et al. | 364/488 |
| 5,778,216 A | * | 7/1998 | Venkatesh | 395/558 |
| 5,790,415 A | * | 8/1998 | Pullela et al. | 364/489 |
| 5,801,958 A | * | 9/1998 | Dangelo et al. | 364/489 |
| 5,883,808 A | * | 3/1999 | Kawarabayashi | 364/488 |

* cited by examiner

Primary Examiner—Vuthe Siek
(74) Attorney, Agent, or Firm—Michael A. Glenn

(57) ABSTRACT

Two time budgeting techniques are provided that are suitable for early and late integrated circuit design phases, respectively. During the early design phase, both the positive and negative slack paths are time budgeted, such that a positive slack path cannot become a negative slack path after budget generation. If all the budget constraints are met by resynthesis for all circuit modules, then the technique guarantees that the final design, when assembled, meets all time constraints. During the late design phase, convergence is guaranteed. Further, synthesis runs for sub-modules focus initially on the worst critical path.

9 Claims, 4 Drawing Sheets

METHOD AND APPARATUS FOR PERFORMING BOTH NEGATIVE AND POSITIVE SLACK TIME BUDGETING AND FOR DETERMINING A DEFINITE REQUIRED CONSTRAINT DURING INTEGRATED CIRCUIT DESIGN

BACKGROUND OF THE INVENTION

1. Technical Field

The invention relates to integrated circuit design. More particularly, the invention relates to the use of an improved time budgeting technique during the design of integrated circuits.

2. Description of the Prior Art

FIG. 1 is a block schematic diagram of a design process 10 that employs time budgeting techniques during the synthesis of a complex integrated circuit. Time budgeting is very important during the design of complex integrated circuits. In the early part of the design cycle, it is important to set realistic constraints for each separate design module. In the late part of the design cycle, convergence issues dominate. Time budgeting is used during the design of integrated circuits because known circuit synthesis techniques are limited with regard to the complexity of circuits that can be processed in a single run. Thus, a complex circuit design is typically subdivided into a plurality of synthesizable sub-modules. A time budgeting algorithm 13 is run on the complete design to generate constraints for the sub-modules. The sub-modules are then run through synthesis separately 15. The resulting modified sub-modules are then reassembled 16 and the whole process is repeated.

The initial netlist 11 that is passed into the flow is a mapped netlist. It is possible to use an area optimized and mapped circuit as the starting point for the flow. At the initial stages, it is necessary that the budgeting algorithm provide realistic constraints 14 because over constraining the synthesis runs may result in a defective netlist that cannot be recovered during subsequent passes through the flow. In the final stages, it is important that the design optimization process converges and that the synthesis runs on the sub-modules at least start out working on the globally critical paths.

One of techniques that is currently being used for time budgeting is referred to as the "characterize" technique. The characterize technique generates constraints for a sub-module based upon a timing analysis that is run on the entire netlist. Specifically, the arrival time constraint for an input port of a sub-module is set to the arrival time for the port for the global timing analysis run. Similarly, the required time constraint for an output port of a sub-module is set to the required time computed in the global timing analysis run at the port.

The characterize constraint generation process makes an inherent assumption that all of the sub-modules, except for the module for which constraints are being generated, are essentially fixed. This is a pessimistic assumption that effectively results in over constraining the sub-module. Thus, this technique does not perform very well during the initial phases of the design.

The characterize technique also does not guarantee convergence, as is shown on FIGS. 2a and 2b, which provide block schematic diagrams that illustrate the characterize technique as used for time budgeting during the design of an integrated circuit. The whole design consists of three identical modules 20, 22, 24 that are coupled in a linear fashion, as shown on FIG. 2(a). As shown, the path spanning across the sub-modules 25 has a slack value of −3. The flop to flop path 26 in each sub-module has a slack value of −4.

When characterize is used as the time budgeting algorithm, the slacks of the paths in the sub-module synthesis runs start out with the same value as for the slacks in the global timing analysis run. Thus, it is possible that the flop to flop path may be improved by a value of 0.5 at the expense of increasing the delay of the sub-path that is part of the longer path by a value of 0.5. As a result, the local slack 28 (see FIG. 2b) at end of the synthesis run has a value of −3.5, which is an improvement from the previous value −4. However, when the designs are reassembled (see FIG. 2b), the long path 27 shows a slack value of −4.5, which is worse than the worst slack in the previous run, i.e. a slack value of −4.

The example shown on FIGS. 2a and 2b illustrates that the characterize technique could result in convergence problems and that the worst slack value may not be improved in a monotonic fashion. The characterize technique, however, does produce synthesis runs of the sub-modules that at least start out working on the globally critical paths because the slacks seen in the sub-module runs start out being the same as those of the global timing analysis run.

It would be advantageous to provide a time budgeting technique that optimizes constraints for each sub-module during an early design phase, while guaranteeing convergence during a late design phase.

SUMMARY OF THE INVENTION

The invention provides two techniques that are useful during the early and late design phases of an integrated circuit, respectively. During the early design phase, both positive and negative slack paths are budgeted. This technique provides the advantage over the prior art that a positive slack path never turns into a negative slack path after budget generation. Also, if all of the budget constraints are met by resynthesis for all of the modules, then the technique guarantees that the final design, when assembled, meets all constraints.

During the late design phase, convergence is guaranteed. Further, synthesis runs for the sub-modules focus initially on the worst critical path.

DETAILED DESCRIPTION OF THE INVENTION

The invention provides two techniques that are useful during the early and late design phases of an integrated circuit, respectively. The technique that is applied during the early design phase budgets both positive and negative slack paths. This technique provides the advantage over the prior art that a positive slack path never turns into a negative slack path after budget generation. Also, if all of the budget constraints are met by resynthesis for all of the modules, then the technique guarantees that the final design, when assembled, meets all constraints. During the late design phase, convergence is guaranteed. Further, the synthesis runs for the sub-modules focus initially on the worst critical path.

Figure 1:
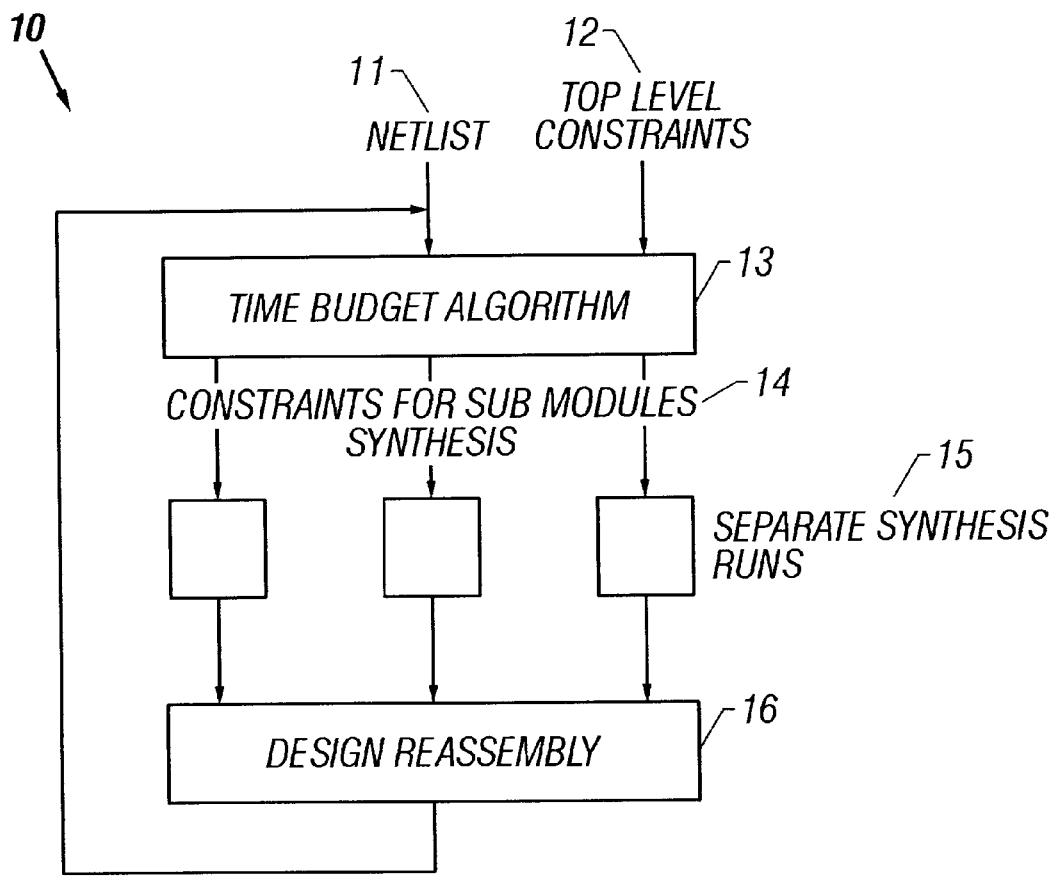
FIG. 1 is a block schematic diagram of a design process that employs time budgeting techniques during the synthesis of a complex integrated circuit.
Figure 3:
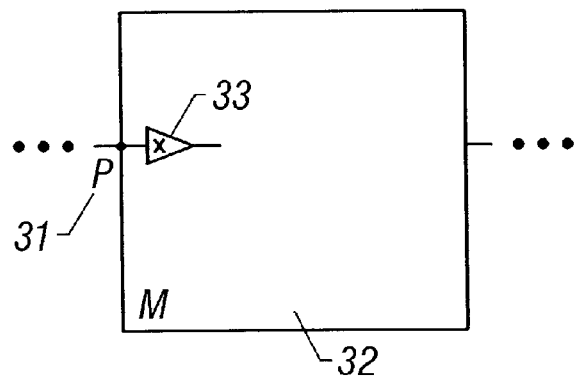
FIG. 3 is a block schematic diagram of a sub-module that illustrates budgeted arrival time according to the invention.

The preferred embodiment of the invention provides an algorithm that is run on a complete netlist. The algorithm performs both negative and positive slack budgeting. For ease of exposition, the algorithm is described with the assumption that wire delays are always the same value for all sinks of a net. FIG. 3 is a block schematic diagram of a sub-module that illustrates budgeted arrival time according to the invention. For a port p 31 (e.g. an input port or an output port) of a sub-module M 32 having a driver x 33, a quantity referred to herein as the budgeted arrival time is defined, which has a computation that is described below. The preferred implementation of the invention also includes a quantity referred to herein as the changeable delay of a path, which is defined as the sum of the delays of edges of the paths having delays that are not fixed.

The following function illustrates the budgeted arrival time:

...

BudgetArrivalTime(Port p of sub module M) {
x<-driver of port p;
arr<-arrival at x;
slk<-slack of x;
if (slk<0) {
PI<-Path to x that causes the worst arrival time at x.
Pr<-Path from x that causes the worst required time at x.
lDelay<-changeable delay of PI;
rDelay<-changeable delay of Pr;
}else{
lDelay<-max changeable delay of any path to x;
rDelay<-max changeable delay of any path from x; }
return arr+slk*(lDelay/(lDelay+rDelay)) }

...

The budget arrival time computation for ports depends on whether the port drive has positive or negative slacks. The computation of negative slacks depends specifically upon the changeable delay of paths PI and Pr, that cause the arrival and required time at x respectively. In the case of positive slacks, the maximum changeable delay of any path to x and any path from x is used in the computation. This results in different values for lDelay and rDelay, when compared to the computation used for negative slacks because the value is dependent solely upon the delays of the paths. The value is independent of user specified arrival and required times at the complete circuit boundary, and also independent of the cycle time.

Figure 4:
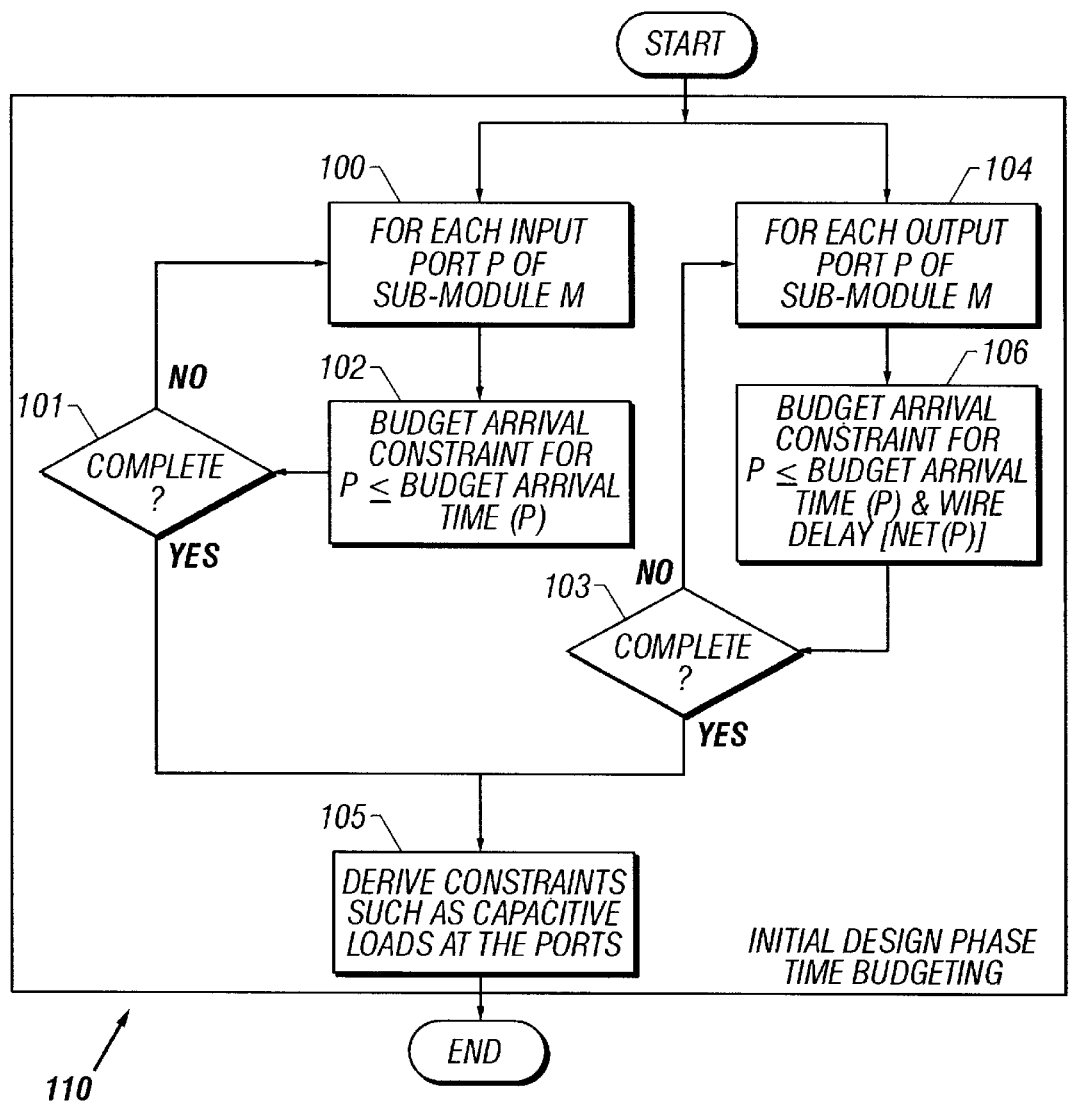
FIG. 4 is a flow diagram that illustrates a preferred algorithm for generation of time budgets for a sub-module M according to the invention.

The preferred algorithm for generation of time budgets for a sub-module M is shown on FIG. 4, which is a flow diagram. At the initial design phase (110), for each input port p of M (100) the Budget arrival constraint for p<-BudgetArrivalTime(p) (102). This determination is made for each sub-module until complete (101). Likewise, for each output port p of M (104), the Budget required constraint for p<-(BudgetArrivalTime(p)+wireDelay(net(p))) (106). This determination is also made for each sub-module until complete (103). The algorithm also derives constraints such as capacitative loads at the ports (105).

The complete algorithm for generation of budgets for a sub-module M is also shown below. The example is based upon the assumption that the wire delay for delay arcs that cross sub-modules, i.e. from a driver in a sub-module to a receiver in another sub-module, is considered fixed (i.e. not changeable). The user, in addition, could specify other arcs to be fixed through any convenient mechanism.

...

lnitialPhaseAlgorithm(M) {
for each input port p of M {
Budget arrival constraint for p<-BudgetArrivalTime(p)
}
for each output port p of M {
Budget required constraint for p<-(BudgetArrivalTime(p)+wireDelay(net(p)))
}
Derive constraints such as capacitative loads at the ports
}

...

The discussion herein intentionally omits details of how the load constraints are obtained for the sub-module M because various techniques are known for determining these constraints. The discussion herein, however, assumes that these constraints result in the correct evaluation of the wire delays of all the port nets in the timing analysis of the sub-module, i.e. to the same value as in the global timing analysis run.

Theorem 1. Consider a port p of a sub-module M having negative (or positive) slack, i.e. its driver has negative (or positive) slack. If the port is an input port, then the BudgetArrivalConstraint(p) <=(or >=) arrival at driver of p in the global timing analysis run. If the port is an output port, then BudgetRequiredConstraint(p) >=(or <=) worst required time in the global timing analysis run of any sink of net connected to p.

The proof of Theorem 1 is straight forward and is hence omitted.

The above theorem implies that, when compared to values obtained using the characterize technique, the arrival and required constraints set by the technique disclosed herein are more relaxed in the case of negative slack ports. In the case of positive slack ports, the arrival and required constraints are more constrained than those of the characterize technique. Thus, there is a chance that a positive slack path in a sub-module M may be over constrained, both because the arrival at the source has been moved forward by the budgeting algorithm, and because the required time at the sink of the path has been moved backwards.

The invention also provides a technique for computing the constraints for the positive slack case which guarantees the following:

Theorem 2. Consider any path P in sub-module M from a port i to a port o. If the slack of the path P is positive in the global timing analysis run, it is positive in the timing analysis run of the sub-module M using the constraints generated by the algorithm.

Proof. If port i and o are negative slack ports, Theorem 1 implies the arrival and required times of i and o respectively are relaxed. Thus, the path P continues to be a positive slack path. If only one port is a negative slack port, then the amount of over constraining is at most a fraction (<=1) of the positive slack of the positive slack port. The slack of the positive slack port is definitely less than the slack of path P. Thus, the slack of path P remains positive under the budgeted constraints.

Figure 5:
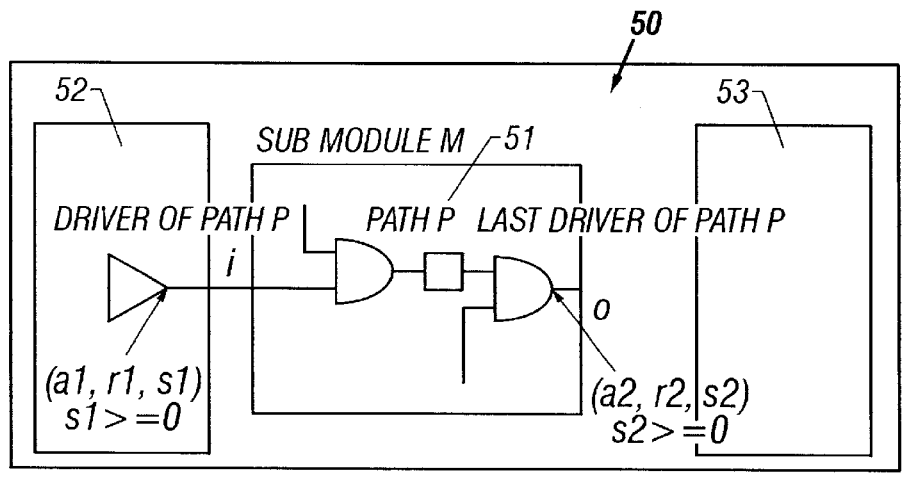
FIG. 5 is a block schematic diagram of a circuit that includes a sub-module M according to the invention.

When both i and o are positive slack ports, it is necessary to show that the amount of over constraining at both ends does not convert the path P into a negative slack path. This is shown as follows:

Let a1, r1, s1 be the arrival, required, and slack of a driver D1 of the path P in the global timing analysis run. Let a2, r2, s2 be the arrival, required, and slack of the last driver D2 of path P in the global timing analysis run. The situation is illustrated on FIG. 5, which is a block schematic diagram of a circuit 50 that includes sub-module M 51.

Let d be the delay of the path P 51 from the driver D1 52 to the last driver D2 53 the path. Let w be the wire delay of the net connected to o. The arrival constraint produced by the algorithm at port i is a1+s1*f1, where f1 is the value of the fraction:

$$lDelay/(lDelay+rDelay)$$

at the driver of path P.

The required constraint produced by the algorithm at port o is:

$$a2+s2*f2+w,$$

where f2 is the appropriate factor at the last driver.

It is necessary to prove that in all cases:

$$a1+s1*f1+d+w<=a2+s2*f2+w,$$

i.e., $$a1+s1*f1+d<=a2+s2*f2+w,$$

The first step in the proof is to observe that f1<=f2. This is because:

$$f1=lDelay1/(lDelay1+rDelay1); \text{ and}$$

$$f2=lDelay2/(lDelay2+rDelay2).$$

From the definition of these quantities for the positive slack case it can be seen that:

$$lDelay1+changeableDelay(P)<=lDelay2; \text{ and}$$

$$rDelay2+changeableDelay(P)<=rDelay1$$

Because changeableDelay(P) >=0, it can be seen that:

$$lDelay1*rDelay2<=lDelay2*rDelay1.$$

This implies:

$$lDelay1/rDelay1<=lDelay2/rDelay2,$$

from which it can be seen that f1<=f2.

It can be seen from the global timing analysis run that:

$$a1+d<=a2.$$

Thus, if s1<=s2, then f1*s1<=f2 s2.

Adding the respective sides of the two inequalities, it can be seen that:

$$a1+d+f1*s1<=a2+f2*s2,$$

which completes the proof.

Thus, it only remains to prove the algorithm in the case where s1>s2. Towards this goal, the following (in)equalities are used, which are satisfied because these numbers are results of a global timing analysis run:

$$r1<=r2-d$$

$$r1=s1+a1$$

$$r2=s2+a2$$

Substituting the last two equalities in the first inequality:

$$a1+d<=a2+s2-s1$$

Thus, $$a1+d+f1*s1<=a2+s2-s1+f1*s1.$$

The quantity:

$$s2-(1/1)*s1<=s2-(1-f2)*s1,$$

because f1<=f2, which in turn is:

$$<=s2-(1-f2)*s2=f2s2,$$

as the case considered here has s1>s2.

Using this and the previous equation:

$$a1+d+f1*s1<=a2+s2*f2.$$

This completes the proof of Theorem 2. The correctness proof of Theorem 2 depends upon the special treatment for positive slack ports. In fact, it would not be true if an identical scheme to negative slack ports was also employed for positive slack points.

The technique described herein also budgets the negative slack paths so that reduced slack targets are set for portions of the path. It also budgets positive slack paths so that slack available is distributed across portions of the path. It furthermore guarantees that positive slack paths never appear as negative slack paths after the budgeting algorithm is executed.

The following theorem shows that the algorithm is successful in budgeting slacks across modules.

Theorem 3. After the constraints are generated by the budgeting algorithm, assume the synthesis run on each sub-module finds a modified version that satisfies the budget constraints, but does not modify the instances connected to boundary. When the design is reassembled, it satisfies all the user constraints.

Proof. The foregoing is readily derived from the fact that the budgeted arrival time for a port p of a sub-module M is the same as the budgeted required time for the output port p' of another sub-module that drives the port p.

Figure 2A:
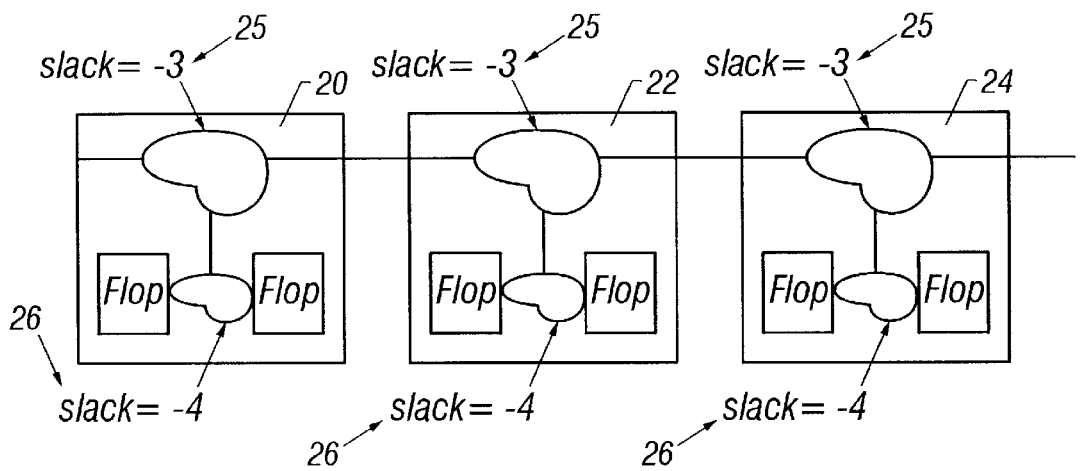
FIG. 2 is a block schematic diagram that illustrates the characterize technique as used for time budgeting during the design of an integrated circuit.
Figure 2B:
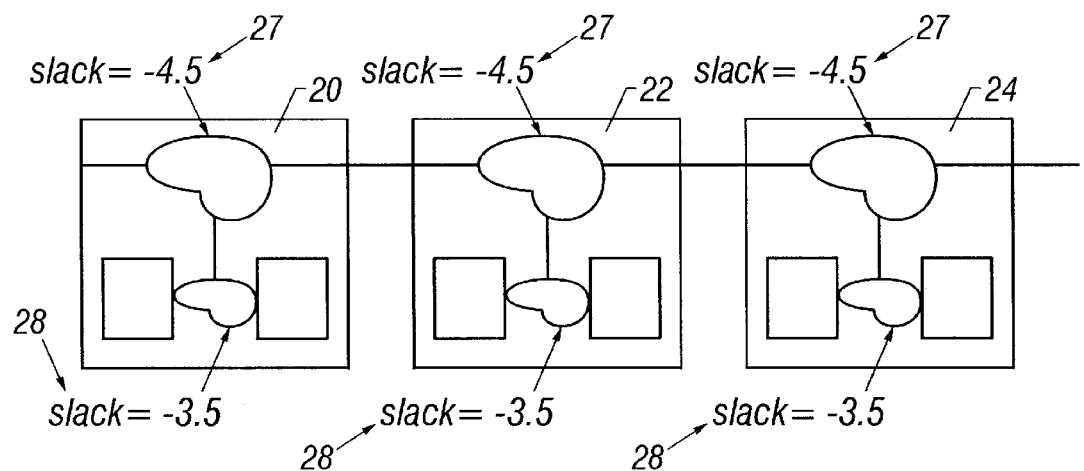

In the event that the sub-module synthesis runs cannot satisfy all budget constraints, it must be determined whether the design process converges. Reference is made again to the example shown on FIGS. 2a and 2b. The budgeted slack for the path in each sub-module that is part of the long path is set to −1. The flop to flop path continues to have a slack value of −4 after budgeting. Thus, the flop to flop path could be improved by the local synthesis run at the expense of the long path. The design when reassembled has a worse overall slack than the starting design.

The technique herein has another limitation that makes it unsuitable for the final design phase. Specifically, it does not guarantee that synthesis runs on the sub-modules work initially on the system's worst slack paths. Assume that the worst slack wslk in a system is caused by a path P that crosses several modules. The budget slack bslk for the portion of the path P in a sub-module M is>wslk. Thus, it is possible that the synthesis run on the local module sees a flop to flop path within the sub-module as more critical than the portion of the path P. The main problem is that while budget slacks gives an idea of the slack that must be fixed at a sub-module, it does not give any idea of the problem at the system level in the system of which it is a part.

Final Design Phase. As described above, the characterize technique has an advantage in that the constraints generated by the characterize technique force the sub-module synthesis runs to concentrate, at least initially, on the system critical paths. The technique, however, has convergence problems that make it unsuitable for the final design phase. These problems arise fundamentally because the synthesis runs on the sub-modules can improve one path while worsening other paths.

To solve the convergence problem, the invention provides a new constraint referred to herein as the "definite required time" which sets an upper bound for the arrival time at an output port. Unlike the regular required time constraint, which is a design goal, the new constraint is a design rule. In other words, the synthesis system must guarantee that these constraints are satisfied, These constraints are of the kind that they are initially satisfied by the circuit design. The synthesis system is constrained to perform only moves that satisfy the definite required time constraints at each step.

A simple approach to solving the convergence issue is to add a definite required time constraint in addition to the regular constraints derived by the characterize technique. Specifically, for each output port of a sub-module, a definite required constraint may be added that requires that the arrival at the port be no worse than the value produced during the global timing analysis run. Clearly, these constraints are initially satisfied for each of the sub-modules. The synthesis runs of the sub-modules optimize the circuit, while satisfying these new constraints. It can be seen that the slack cannot worsen when the design is reassembled.

The problem with the above approach is that it is overly restrictive. The arrival time at all output ports is restricted, without any consideration to its slack. The invention herein addresses this issue. The invention provides a technique that uses the function:

relaxedArrivalTime for a port p (input or output) of a sub module M.

. . .

relaxedArrivalTime(Port p of sub module M) {
x<-driver of port p;
arr<-arrival at x;
slk<-slack of x;
slkworst<-min(worst slack of any node in the transitive fanin to x, 0.0)
lDelay<-max changeable delay of any path to x;
rDelay<-max changeable delay of any path from x;
return arr+(slk-slkworst)*(lDelay/(lDelay+rDelay))*alpha.
. . .

The foregoing function is very similar to the function budgetArrivalTime described above for the case of positive slacks. The present function depends upon a user specified alpha, which can be set between 0.0 and 1.0. Instead of the computation of slkworst shown above, slkworst can be taken to be the minimum of the worst slack in the network and 0.0.

Figure 6:
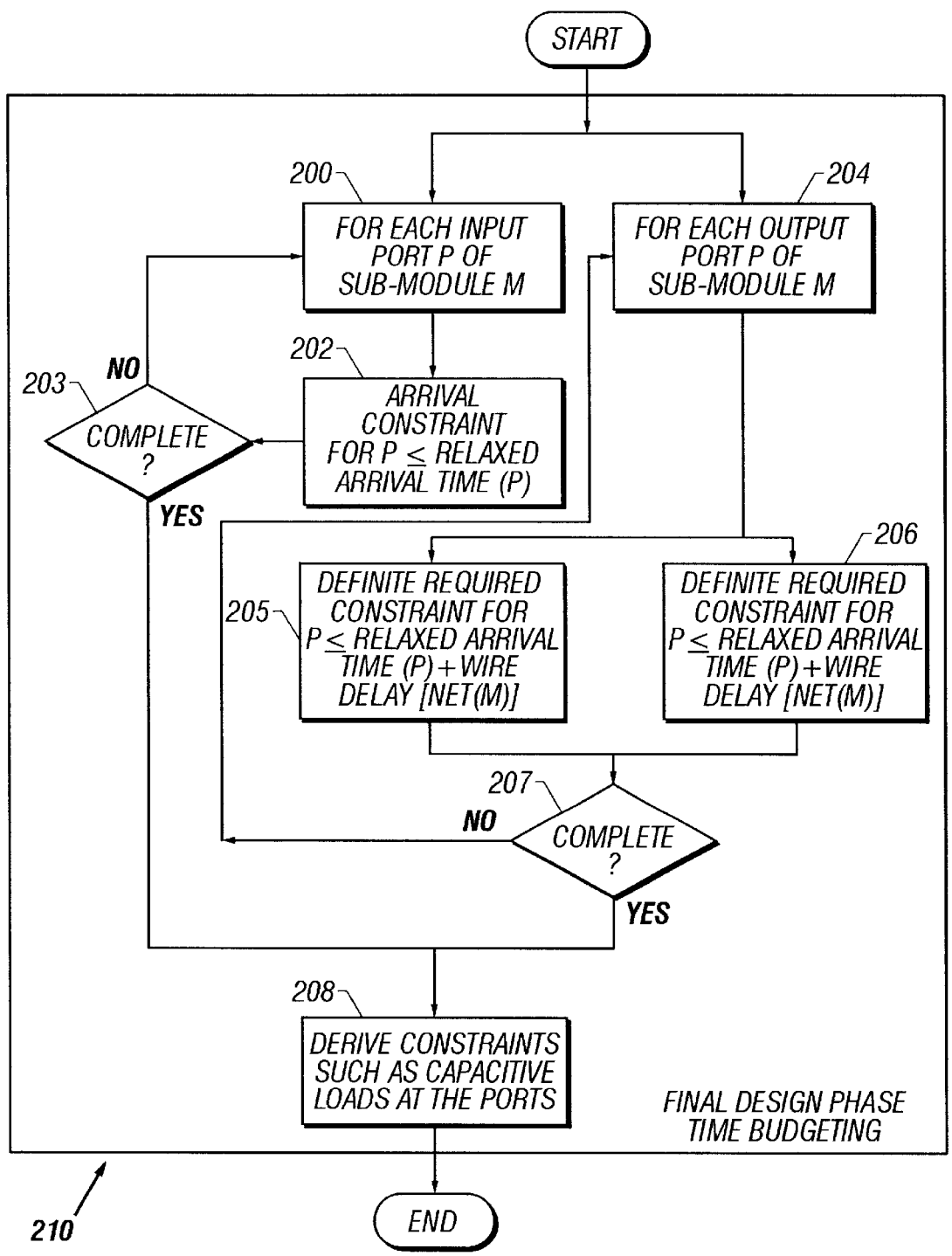
FIG. 6 is a flow diagram that illustrates a preferred algorithm for generation of a definite required time for a sub-module M according to the invention.

FIG. 6 is a flow diagram that illustrates a preferred algorithm for generation of a definite required time for a sub-module M according to the invention. At the final design phase (210), for each input port p of M (200) the arrival constraint for p<-relaxedArrivalTime(p) (202). This determination is made for each sub-module until complete (203). For each output port p of M (204), the required constraint for p<-worst required for any sink of p (205), and the definite required constraint for p<-relaxedArrivalTime(p)+wireDelay(net(p)) (206). This determination is also made for each sub-module until complete (207). The algorithm also derives constraints such as capacitative loads at the ports (208).

The complete description of the herein disclosed time budgeting algorithm for the final phase is also shown below.

. . .

FinalPhaseAlgorithm(M) {
for each input port p of M {
arrival constraint for p<-relaxedArrivalTime(p)
}
for each output port p of M {
required constraint for p<-worst required for any sink of p;
//Same as characterize
definite required constraint for p<-relaxedArrivalTime(p)+wireDelay(net(p))
}
Derive constraints such as capacitative loads at the ports
}
. . .

It is important to note that the above technique moves the arrival constraints at an input port of a sub-module forward, when compared to the characterize technique. The amount of shift forward depends upon the slack of the port. The shifted arrival time plus the net delay is set as the definite required constraint for the driving port. Along the lines very similar to Theorem 2 above, the invention includes the following theorem.

Theorem 4. The definite required time constraint is satisfied at each sub-module. Moreover, the slack (i.e. the margin of meeting the constraint) in the definite required time constraint at an output port p for a path P is at least:

$$alpha*(f2-f1)*(s2-sworst2),$$

where f1, f2, s2 are as described in the proof of Theorem 2 above, and sworst2 is the slack of the transitive fanin of port p.

Proof. With numbers as shown in the proof of Theorem 2 above, it is necessary to prove that:

$$a1+d+alpha*f1*(s1-sworst1)<=a2+alpha*f2*(s2-sworst2),$$

and also to examine the slack in this inequality.

Because sworst1>=sworst2, it is sufficient to prove that:

$$a1+d+alpha*f1*(s1-sworst2)<=a2+alpha*f2*(s2-sworst2).$$

The slack of the above equation is less than the slack of the former equation. The above equation can be rewritten as:

$$a1+d+alpha*f1*(s1-min(s1,s2))<=$$
$$a2+alpha*f2*(s2-min(s1,s2))+alpha*(f2-f1)*(min(s1,s2)-sworst2).$$

Using a proof identical to proof of Theorem 2 above, it can proven that:

$$a1+d+alpha*f1*(s1-min(s1,s2))<=a2+alpha*f2*(s2-min(s1,s2)).$$

Thus, the slack of the inequality is at least:

$$alpha*(f2-f1)*(min(s1,s2)-sworst2).$$

If s1>=s2, then this translates to:

$$alpha*(f2-f1)*(s2-sworst2),$$

thereby completing the proof.

In the other case, i.e. s1<s2, there is also extra slack in the rest of the inequality, $$a1+d+alpha*f1*(s1-min(s1,s2))<=a2+alpha*f2*(s2-min(s1,s2))$$

that must be added to get the total slack of the equation. Because s1<s2 in this case, the inequality simplifies to:

$$a1+d<=a2+alpha*f2*(s2-s1).$$

Because a1+d<=a2 is known from timing analysis, the above equality has an extra slack of:

$$alpha*f2*(s2-s1)$$

that must be added to get the overall slack. In other words, the total slack of the equation in this case is:

$$alpha*(f2-f1)*(min(s1,s2)-sworst2)+alpha*f2*(s2-s1)=$$

$$alpha*(f2-f1)*(s1-sworst2)+alpha*f2*(s2-s1)=$$

$$alpha*(f2-f1)*(s2-sworst2)+alpha*f1*(s2-s1)>=$$

$$alpha*(f2-f1)*(s2-worst2).$$

Theorem 4 shows that the definite required time constraints are initially satisfied in each of the sub-module runs. Also, the lower bound on the slack available at a output port increases with alpha, giving more room for change in the sub-module optimization. However, increasing alpha has a negative effect because the arrival time at the source of a path having a slack s is moved forward by at most alpha* (s−sworst), reducing the slack of the path by the same amount because required time is not shifted by the technique herein. Thus, an appropriate value of alpha must be chosen. It should be noted that despite the shift in the arrival times, the global critical path is still seen as the worst path to work on in each of the sub-modules that it passes. This is because the shift in arrival time proportionally worsens the slack of paths towards the worst slack.

The following theorem that establishes the convergence properties of the techniques disclosed herein.

Theorem 5. Assume that the worst slack among each of the sub-modules after synthesis (i.e. the worst slack that still maintains the required constraints) is slk, and that the individual module synthesis does not modify the boundary cells of any module. If the sub-modules are reassembled, then the worst slack in the complete design is guaranteed to be not worse than slk.

Proof. This is because the arrival times assumed by a sub-module for an input port are guaranteed by a definite required constraint at the driver sub-module.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A storage medium containing a computer program for operating a computer to implement a synthesis system that determines time budgeting during integrated circuit design, said computer program comprising a method comprising the steps of:

using positive and negative slack budgeting to determine a budgeted arrival time for all sub-modules of a complete netlist during an initial design phase of said integrated circuit, wherein said budgeted arrival time is based upon a changeable delay of a path, which changeable delay comprises a sum of delays of edges of paths within said integrated circuit whose delays are not fixed, determination of said budgeted arrival time comprising the steps of:

determining a budget arrival time constraint for each input port of each sub-module of said integrated circuit; and determining a budget required time constraint for each output port of each sub-module of said integrated circuit;

wherein a positive slack path never turns into a negative slack path after budget generation;

determining a definite required time constraint during a final design phase of said integrated circuit, wherein said definite required time constraint sets an upper bound for an arrival time at each output port of each sub-module within said integrated circuit which requires that arrival at said output port be equal to or greater than than a value produced during a global timing analysis run, said definite required time constraint step further comprising the step of:

determining a relaxed arrival time during said final design phase of said integrated circuit, wherein said relaxed arrival time shifts arrival constraints at each input port of each sub-module forward, where the amount of such shift forward depends upon slack of said input port; and wherein said shifted arrival time plus a net delay comprises said definite required time constraint for said output port; and using said budgeted arrival time and said definite required time constraint during a synthesis step in the design of said integrated circuit.

2. The method of claim 1, further comprising the step of:

determining negative slack based upon a changeable delay of a path that causes both a worst determined arrival time at a sub-module port and a worst determined required time at said sub-module port.

3. The method of claim 1, further compromising the step of:

determining positive slack based upon a maximum changeable delay of any path to a sub-module port and any path from said sub-module port.

4. The method of claim 1, further comprising the step of:

fixing wire delays for delay arcs that cross said sub-modules.

5. A synthesis system that determines time budgeting during integrated circuit design, comprising:

a module for using positive and negative slack budgeting to determine a budgeted arrival time for all sub-modules of a complete netlist during an initial design phase of said integrated circuit, wherein said budgeted arrival time is based upon a changeable delay of a path, which changeable delay comprises a sum of delays of edges of paths within said integrated circuit whose delays are not fixed, determination of said budgeted arrival time comprising the steps of:

determining a budget arrival time constraint for each input port of each sub-module of said integrated circuit; and determining a budget required time constraint for each output port of each sub-module of said integrated circuit;

wherein a positive slack path never turns into a negative slack path after budget generation;

a module for determining a definite required time constraint during a final design phase of said integrated circuit, wherein said definite required constraint sets an upper bound for an arrival time at each output port of each sub-module within said integrated circuit which requires that arrival at said output port be equal to or greater than a value produced during a global timing analysis run, said definite required constraint comprising the step of:

determining a relaxed arrival time during said final design phase of said integrated circuit, wherein said relaxed arrival time shifts arrival time constraints at each input port of each sub-module forward, where the amount of such shift forward depends upon slack of said input port; and wherein said shifted arrival time plus a net delay comprises said definite required time constraint for said output port; and a module for using said budgeted arrival time and said definite required time constraint during a synthesis step in the design of said integrated circuit.

6. The apparatus of claim 5, further comprising the step of:

determining negative slack based upon a changeable delay of a path that causes both a worst arrival time at a sub-module port and a worst required time at said sub-module port.

7. The apparatus of claim 5, further comprising the step of:

determining positive slack based upon a maximum changeable delay of any path to a sub-module port and any path from said sub-module port.

8. The apparatus of claim 5, further comprising the step of:

fixing wire delays for delay arcs that cross said sub-modules.

9. In a computer including a processor and memory, a computer program resident in said computer's memory for operating said computer to implement a synthesis system that determines time budgeting during integrated circuit design, said computer program comprising a method comprising the steps of:

using positive and negative slack budgeting to determine a budgeted arrival time for all sub-modules of a complete netlist during an initial design phase of said integrated circuit;

determining a definite required time constraint during a synthesis step in a final design phase of said integrated circuit; and using said budgeted arrival time and said definite required time constraint during said synthesis step in the design of said integrated circuit.

* * * * *